(12) United States Patent
Bennett

(10) Patent No.: US 11,643,191 B2
(45) Date of Patent: *May 9, 2023

(54) AIRCRAFT LANDING GEAR ASSEMBLY

(71) Applicant: Safran Landing Systems UK LTD, Gloucester (GB)

(72) Inventor: Ian Robert Bennett, Gloucester (GB)

(73) Assignee: Safran Landing Systems UK LTD

(*) Notice: Subject to any disclaimer, the term of this patent is extended or adjusted under 35 U.S.C. 154(b) by 0 days.

This patent is subject to a terminal disclaimer.

(21) Appl. No.: 17/750,812

(22) Filed: May 23, 2022

(65) Prior Publication Data

US 2022/0281589 A1 Sep. 8, 2022

Related U.S. Application Data

(63) Continuation of application No. 16/580,118, filed on Sep. 24, 2019, now Pat. No. 11,390,379.

(30) Foreign Application Priority Data

Sep. 26, 2018 (EP) .................................... 18196956

(51) Int. Cl.
*B64C 25/26* (2006.01)
*B64C 25/20* (2006.01)

(52) U.S. Cl.
CPC .............. *B64C 25/26* (2013.01); *B64C 25/20* (2013.01)

(58) Field of Classification Search
CPC ......... B64C 25/10; B64C 25/58; B64C 25/26; B64C 25/20; B64C 25/14; B64C 2025/125; B64C 2001/0072

See application file for complete search history.

(56) References Cited

U.S. PATENT DOCUMENTS

| 2,859,006 A | 11/1958 | Lucien |
| 2,959,381 A | 11/1960 | Hartel |
| 4,422,603 A | 12/1983 | Turiot et al. |
| 7,967,245 B2 | 6/2011 | Seror-Goguet et al. |

(Continued)

FOREIGN PATENT DOCUMENTS

| EP | 2130765 A2 | 12/2009 |
| GB | 2161202 A | 1/1986 |

(Continued)

OTHER PUBLICATIONS

Russian Office Action for Russian Application No. 2018143415 dated Dec. 6, 2021, with translation, 15 pages.

(Continued)

*Primary Examiner* — Medhat Badawi
*Assistant Examiner* — Vicente Rodriguez
(74) *Attorney, Agent, or Firm* — RatnerPrestia

(57) ABSTRACT

An aircraft landing gear assembly having a reinstating geometry in which a lock link can be moved to assume a first locking condition to inhibit movement of a stay when a main strut is in a deployed condition and a second locking condition to inhibit movement of the main strut when in a stowed condition. An unlock actuator is coupled between a first element of the stay and the lock link such that the actuator can break the lock link from the first locking condition and force it to assume the second locking condition by operational force in a single direction.

11 Claims, 6 Drawing Sheets

(56) References Cited

U.S. PATENT DOCUMENTS

| | | | |
|---|---|---|---|
| 8,820,679 B2* | 9/2014 | Martinez | B64C 25/14 |
| | | | 244/102 SL |
| 2009/0250552 A1* | 10/2009 | Kearns | F16H 25/20 |
| | | | 244/102 A |
| 2012/0037752 A1* | 2/2012 | Collins | B64C 25/26 |
| | | | 244/102 R |
| 2013/0119197 A1* | 5/2013 | Ducos | B64C 25/26 |
| | | | 244/102 R |
| 2016/0137295 A1 | 5/2016 | Bond et al. | |
| 2016/0347444 A1* | 12/2016 | Vatovec | F03G 1/10 |

FOREIGN PATENT DOCUMENTS

| | | |
|---|---|---|
| RU | 37349 U1 | 4/2004 |
| RU | 2588357 C1 | 6/2016 |

OTHER PUBLICATIONS

Extended European Search Report for European Application No. 18 196 956.9, dated Feb. 21, 2019, 7 pages 2019.
Entire patent prosecution history of U.S. Appl. No. 16/580,118, filed Sep. 24, 2019, entitled, "Aircraft Landing Gear Assembly".

* cited by examiner

AIRCRAFT LANDING GEAR ASSEMBLY

This application is a continuation of U.S. application Ser. No. 16/580,118, filed on Sep. 24, 2019, which claims the benefit of and priority to European Patent Application No. EP18196956.9, filed on Sep. 26, 2018, both of which are incorporated herein by reference.

BACKGROUND

An aircraft landing gear assembly generally includes a main load bearing strut arranged to be pivotally coupled to an aircraft so that it can be stowed within the aircraft for flight, and deployed from the aircraft for take-off, landing, and supporting the weight of the aircraft while it is on the ground.

A retraction actuator is generally provided to move the main strut between the deployed and stowed conditions. It is common for the retraction actuator to have one end arranged to be pivotally coupled to the aircraft.

It is known for an aircraft landing gear assembly to be provided with one or more stays each having a locking condition in which it is arranged to hold the main strut in the deployed condition. It is common for stays to have one end arranged to be pivotally coupled to the aircraft for load reaction purposes.

Each stay can in turn be held in the locking condition by a lock link, each lock link having a locking condition in which it holds a respective stay in the locking condition.

Each lock link can be provided with an unlock actuator arranged to move it from the locking condition to a passive condition in which the stay can be folded from the locking condition to a passive condition, to allow the main strut to be moved to the stowed condition by the retraction actuator.

It is known for an aircraft landing gear assembly to be provided with an up-lock having a locking condition in which the main strut is held in the stowed condition within the aircraft. It is common for an up-lock to be movably coupled to the aircraft.

A known subclass of aircraft landing gear assembly has a "reinstating", "re-erecting" or "self-resurrecting" geometry in which the lock link is arranged such that it can be placed in the locking condition when the landing gear assembly is deployed and also placed in the locking condition when the landing gear assembly is stowed.

The lock link can be anchored to the aircraft or alternatively another part of the landing gear assembly. The latter arrangement is preferable since it avoids an additional attachment point or "hard point" on the aircraft.

This type of reinstating landing gear assembly advantageously avoids the need for an up lock and hard points on the aircraft for the lock link anchor. However, the present inventor has identified two problems with such an arrangement, as set out below.

Firstly, in order to avoid the use of sequential control during movement of the main strut from one condition to the other, it is preferred that the unlock actuator applies load in one direction through one movement phase of the main strut and applies load in the opposite direction through the opposite movement phase. For example, the unlock actuator may be required to shorten to unlock from the deployed condition and extend to unlock in the stowed condition. However, the unlock actuator is also required to force the lock link to assume the locked condition in the up lock situation where the main strut is in the stowed condition. When attached to the main strut the lock link and stay member, to which the lock link is attached, will be in the same relative position when the main strut is deployed and stowed, hence requiring load reversal of the unlock actuator to unlock and relock if the unlock actuator is mounted in a common position between two of these parts. A solution is to attach one end of the unlock actuator to the aircraft, but this requires a further hard point.

Secondly, there is a certain amount of energy required to unlock the lock link due to the fact that when in the locking condition a lock link is generally sprung into a generally aligned, over-centre position. In the event of a malfunction, such as a loss of the primary supply of hydraulic pressure, the unlock actuator would not be able to release the landing gear allowing it to fall into the down position. Consequently it is beneficial to add a second actuation means to release the gear from the retracted position. This may take the form of a 'kicker' actuator. It is however desirable to locate the kicker actuator such that inadvertent operation does not release the lock link when in the deployed locking condition. As such, it is known to mount the kicker actuator on the aircraft, thus requiring a further hard point.

The present inventor has devised a simplified reinstating landing gear assembly in comparison to known assemblies.

SUMMARY

By way of an overview, embodiments of the invention provide an aircraft landing gear assembly having a reinstating geometry in which a lock link can be moved to assume a first locking condition to inhibit movement of a stay when a main strut is in a deployed condition and a second locking condition to inhibit movement of the main strut when in a stowed condition. An unlock actuator is coupled between a first element of the stay and the lock link such that the actuator can break the lock link from the first locking condition and force it to assume the second locking condition by operational force in a single direction. Alternatively or in addition, an auxiliary unlock actuator can be mounted on the first element of the stay to face the lock link when the main strut is in a stowed condition.

In accordance with a first aspect of the present invention, there is provided an aircraft landing gear assembly comprising: a main load bearing strut, a stay and a lock link. The main load bearing strut has a first end arranged to be movably coupled to an aircraft for the strut to be moved between a stowed condition for flight and a deployed condition for take-off and landing, and a second end arranged to define or be coupled to a ground contacting assembly. The stay comprises a first stay element having a first end pivotally coupled to a first end of a second stay element to define a stay apex joint, a second end of the first stay element being arranged to be pivotally coupled to the aircraft and a second end of the second stay element being arranged to be pivotally coupled to the strut such that the stay can be folded and unfolded between: a locking condition in which the stay inhibits movement of the strut from the deployed condition to the stowed condition; and a passive condition in which the stay permits movement of the strut from the deployed condition to the stowed condition. The lock link comprises a first link element having a first end pivotally coupled to a first end of a second link element to define a lock link apex joint, a second end of the first link element being pivotally coupled to the strut at a first location which is closer to the first end of the strut than the second end, and a second end of the second link element being coupled to the stay at or adjacent to the stay apex joint such that the lock link can be folded and unfolded between: a first locking condition in which the lock link inhibits movement of the stay from the locking condition to the passive condition; a passive condition in which the lock link permits movement of the stay from the locking condition to the passive condition; and a second locking condition in which the lock link inhibits movement of the strut from the stowed condition towards the deployed condition, the passive condition lying between the first and second locking conditions as the strut moves between the deployed condition and stowed condition. The assembly also has an unlock actuator having a first end pivotally coupled to the first stay element at a first actuator pivot point and a second end pivotally coupled to the lock link at a second actuator pivot point such that the actuator can move the lock link from the first locking condition to the passive condition by one of extending or retracting and that the actuator can move the lock link from the passive condition to the second locking condition by the same one of extending or retracting.

Thus, an aircraft landing gear assembly according to the first aspect of the invention includes an unlock actuator that is anchored to the upper stay element. The present inventor has found that this results in a reinstating geometry in which the unlock actuator can apply load in one direction only to unlock the lock link from the deployed strut condition and then lock it again in the stowed gear condition, thus avoiding the need for sequential control during movement of the main strut from one condition to the other.

The landing gear assembly can be arranged such that the unlock actuator can move the lock link from the second locking condition to the passive condition by the opposite one of extending or retracting.

The first end of the unlock actuator can be coupled to the first stay element at a location which is closer to the stay apex joint than the second end of the first stay element. This can result in an arrangement in which operational travel of the unlock actuator can be reduced in comparison to some embodiments.

The second end of the unlock actuator can be pivotally coupled to the second link of the lock link. This can result in an arrangement in which operational travel of the unlock actuator can be reduced in comparison to some embodiments.

The aircraft landing gear assembly can further comprise an auxiliary unlock actuator including an end effector, and being operable to move the end effector along an actuation path between a first extension state and a second extension state, the auxiliary unlock actuator being either: mounted on the stay and arranged such that when the lock link is in the second locking condition the lock link intersects the actuation path but when the lock link is in the first locking condition the lock link does not intersect the actuation path, such that movement of the end effector from the first extension state to the second extension state unlocks the lock link by contacting the lock link when the lock link is in the second locking condition, but movement of the end effector from the first extension state to the second extension state does not unlock the lock link when the lock link is in the first locking condition; or mounted on the lock link and arranged such that when the lock link is in the second locking condition the stay intersects the actuation path, but when the lock link is in the first locking condition the stay does not intersect the actuation path such that movement of the end effector from the first extension state to the second extension state unlocks the lock link by contacting the stay when the lock link is in the second locking condition but movement of the end effector from the first extension state to the second extension state does not unlock the lock link when the lock link is in the first locking condition. This can result in an arrangement in which the size and/or weight of the unlock actuator can be reduced and/or improved reliability of unlocking of the lock link from the second locking condition in comparison to some embodiments without requiring a further hard point on the aircraft.

The aircraft landing gear assembly can further comprise a retraction actuator operable to change in length between a first extension state and a second extension state, the retraction actuator being coupled to the main strut such that movement of the retraction actuator from the first extension state to the second extension state causes the main strut to move from the deployed condition to the stowed condition.

The retraction actuator can be distinct from the unlock actuator.

The unlock actuator can comprise a linear actuator, and/or the auxiliary unlock actuator comprises a linear actuator, and/or the retraction actuator comprises a linear actuator.

In accordance with a second aspect of the present invention, there is provided an aircraft landing gear assembly comprising main load bearing strut, a stay and a lock link. The main load bearing strut has a first end arranged to be movably coupled to an aircraft for the strut to be moved between a stowed condition for flight and a deployed condition for take-off and landing, and a second end arranged to define or be coupled to a ground contacting assembly. The stay comprises a first stay element having a first end pivotally coupled to a first end of a second stay element to define a stay apex joint, a second end of the first stay element being arranged to be pivotally coupled to the aircraft and a second end of the second stay element being arranged to be pivotally coupled to the strut such that the stay can be folded and unfolded between: a locking condition in which the stay inhibits movement of the strut from the deployed condition to the stowed condition; and a passive condition in which the stay permits movement of the strut from the deployed condition to the stowed condition. The lock link comprises a first link element having a first end pivotally coupled to a first end of a second link element to define a lock link apex joint, a second end of the first link element being pivotally coupled to the strut at a first location which is closer to the first end of the strut than the second end, and a second end of the second link element being coupled to the stay at, or adjacent to, the stay apex joint such that the lock link can be folded and unfolded between: a first locking condition in which the lock link inhibits movement of the stay from the locking condition to the passive condition; a passive condition in which the lock link permits movement of the stay from the locking condition to the passive condition; and a second locking condition in which the lock link inhibits movement of the strut from the stowed condition towards the deployed condition, the passive condition lying between the first and second locking conditions as the strut moves between the deployed condition and stowed condition. The assembly includes an auxiliary unlock actuator including an end effector and being operable to move the end effector along an actuation path between a first extension state and a second extension state, the auxiliary unlock actuator being either: mounted on the stay and arranged such that when the lock link is in the second locking condition the lock link intersects the actuation path, but when the lock link is in the first locking condition the lock link does not intersect the actuation path such that movement of the end effector from the first extension state to the second extension state unlocks the lock link by contacting the lock link when the lock link is in the second locking condition, but movement of the end effector from the first extension state to the second extension state does not unlock the lock link when the lock link is in the first locking condition; or mounted on the lock link and arranged such that when the lock link is in the second locking condition the stay intersects the actuation path, but when the lock link is in the first locking condition the stay does not intersect the actuation path such that movement of the end effector from the first extension state to the second extension state unlocks the lock link by contacting the stay when the lock link is in the second locking condition, but movement of the end effector from the first extension state to the second extension state does not unlock the lock link when the lock link is in the first locking condition.

Thus, the landing gear assembly according to the second aspect is provided with an auxiliary unlock actuator that does not require a dedicated hard point on the airframe and is arranged such that inadvertent operation of the auxiliary unlock actuator will not unlock the gear when in the deployed condition. This can result in an arrangement in which the size and/or weight of the unlock actuator can be reduced and/or improved reliability of unlocking of the lock link from the second locking condition in comparison to some arrangements, without requiring a further hard point on the aircraft.

The auxiliary unlock actuator can be coupled to the stay; for example, the first stay element.

The auxiliary unlock actuator can be rigidly coupled to the stay or lock link such that movement of the stay causes direct corresponding movement of the auxiliary unlock actuator. The actuator can for example be coupled by a mechanical fixing, such as one or more nut and bolt arrangements, to a mounting lug on the stay or lock link.

The auxiliary unlock actuator can comprise a linear actuator and be coupled to the first stay element in an orientation such that the actuation path of the end effector is generally parallel with respect to the longitudinal axis of the first stay element, or generally perpendicular to the contacting surface of the lock link Alternatively, the auxiliary unlock actuator can be pivotally coupled to the first stay element and pivotally coupled to a leg, the leg being pivotally coupled to the stay and defining the end effector.

The auxiliary unlock actuator can be powered by a different power source than the unlock actuator, such as different hydraulic or electrical supplies.

Optional features of the first aspect can be applied to the second aspect and vice versa.

In accordance with a third aspect of the invention, there is provided a aircraft including one or more aircraft landing gear assemblies according to the first and/or second aspects.

BRIEF DESCRIPTION OF THE DRAWINGS

By way of example only, certain embodiments of the invention will now be described by reference to the accompanying drawings, in which.

DETAILED DESCRIPTION

Figure 1:
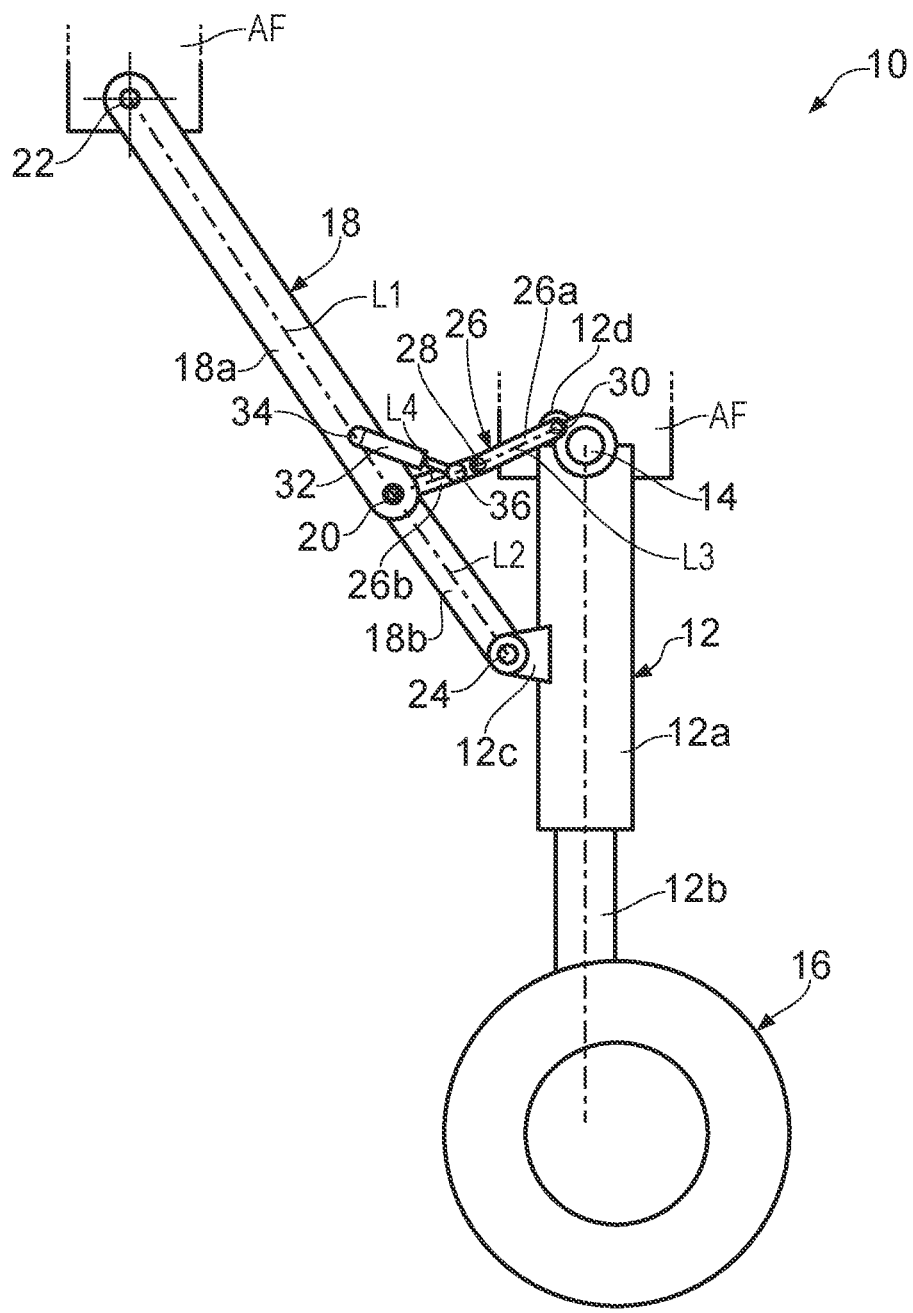
FIG. 1 is a diagram of an aircraft landing gear assembly according to an embodiment of the invention in a deployed condition with the stay and lock link in locking conditions.

FIG. 1 shows an aircraft landing gear assembly 10 according to an embodiment of the invention. The aircraft landing gear assembly 10 can be a main landing gear assembly or a nose gear assembly.

The main load bearing strut 12 has a main aircraft pivot bearing 14 at a first, upper end which is arranged to provide a pivot coupling to the airframe AF of an aircraft. The strut 12 can be moved about the axis of the pivot bearing 14 between a stowed condition for flight and a deployed condition for take-off, landing and taxiing.

In this embodiment the strut 12 is a shock absorbing oleo strut having an upper cylinder 12*a* and telescoping sliding tube 12*b*. However, in other embodiments the strut can take any suitable form and can for example comprise a rigid strut.

A second end of the strut 12, in this embodiment a lower end of the sliding tube 12*b* when the strut 12 is deployed, is arranged to define or be coupled to a ground contacting assembly such as a wheel and brake assembly 16. In this embodiment a lower end of the sliding tube 12*b* is arranged to be coupled to the ground contacting assembly. The wheel and brake assembly can comprise one or more wheel and brake sets mounted on one or more axles. In some embodiments a plurality of axles can be mounted on a bogie beam or other pivoting arm pivotally coupled directly or indirectly to the second end of the strut. In other embodiments the ground contacting assembly can comprise a skid or the like.

The landing gear assembly 10 further comprises a stay 18 arranged to hold the main strut 12 in the deployed condition. The stay 18 comprises a first stay element 18*a* having a first end pivotally coupled to a first end of a second stay element 18*b* to define a stay apex joint 20, a second end of the first stay element 18*a* defining a stay pivot bearing 22 via which the stay 18 is arranged to be pivotally coupled to the airframe AF of the aircraft. A second end of the second stay element 18*b* defines a second stay pivot bearing 24 which is arranged to be pivotally coupled to a lug 12*c* on the outer cylinder 12*a* of the strut 12 such that the stay 14 can be folded and unfolded between a locking condition as shown in FIG. 1, in which the stay inhibits movement of the strut from the deployed condition to the stowed condition, and a passive condition in which the stay permits movement of the strut from the deployed condition to the stowed condition.

In the illustrated embodiment the stay elements 18*a*, 18*b* are elongate, straight bars having lug pairs at their ends to define the stay pivot bearings 22, 24 and the stay apex joint 20. Thus, each stay element 18*a*, 18*b* has a longitudinal axis L1, L2 extending between the pivot axes at its ends. When in the locking condition, the longitudinal axis L1 of the first stay element 18a is generally aligned with the longitudinal axis L2 of the first stay element 18b to place the stay 18 in an over-centre arrangement in which one or more abutments (not shown) prevent further folding of the stay 18 in one direction of rotation about the apex joint 20. In this condition, the stay 18 reacts axial loads applied to it by the main strut 12 attempting to move from the deployed condition. When the stay 18 is folded, it does not react axial loads applied to it by the main strut 12 to hold the main strut 12 in the deployed condition. In other embodiments the stay elements 18a, 18b can have any suitable form; for example, the stay need not be over-centre when in the locking condition, as a lock link (described below) can hold the stay in a locking condition.

The landing gear assembly 10 further comprises a lock link 26 comprising a first link element 26a having a first end pivotally coupled to a first end of a second link element 26b to define a lock link apex joint 28, and a second end of the first link element 26a defining a lock link pivot bearing 30 via which the lock link is arranged to be pivotally coupled to the strut 12 at a first location which is closer to the first end of the strut 12 than the second end. The lock link pivot bearing 30 can be pivotally coupled to a lug 12d or other suitable mounting formations which extend from a region of the main strut 12 above the main aircraft pivot bearing 14 towards the stay pivot bearing 22. A second end of the second link element 26b defines a pivot bearing which is pivotally coupled to the stay apex joint 20. In other embodiments the lock link can have any suitable attachment point to the main strut and stay.

Figure 2:
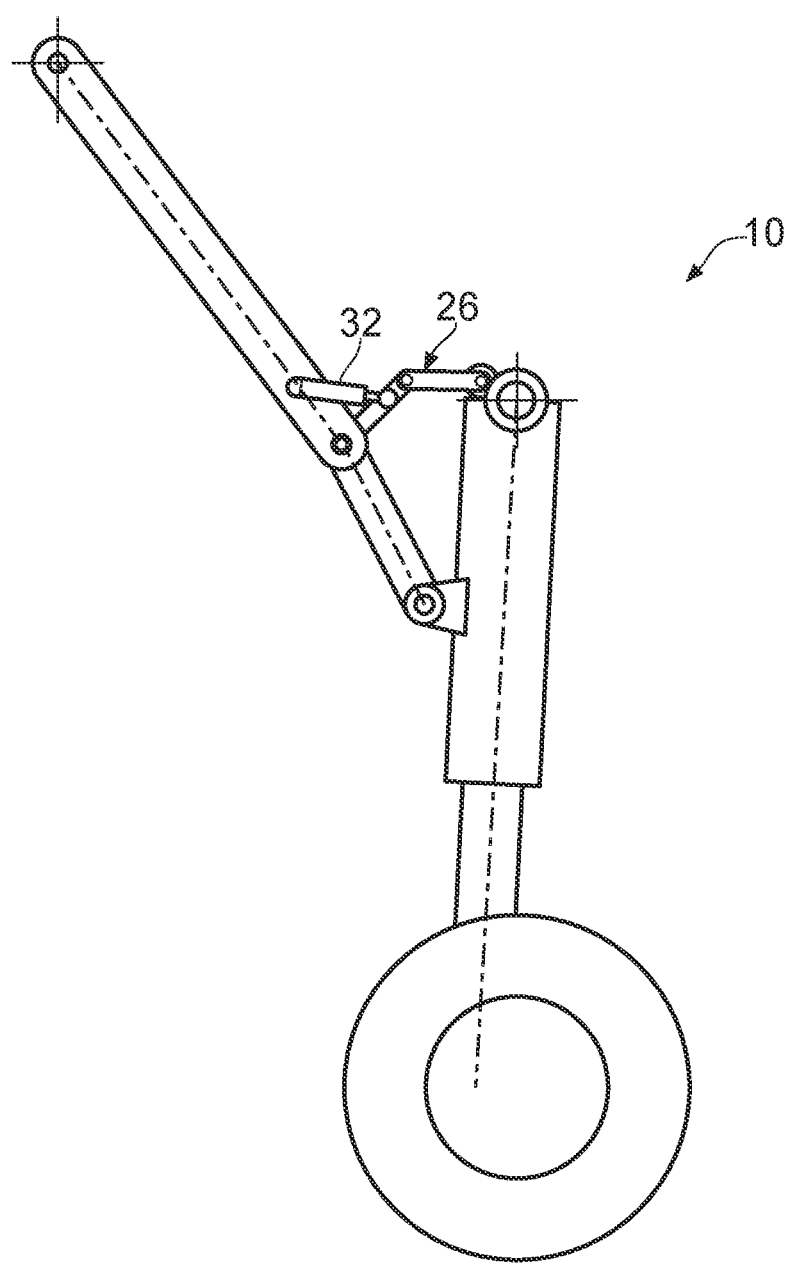
FIG. 2 is a diagram of the landing gear assembly of FIG. 1 with the lock link in the passive condition.
Figure 3:
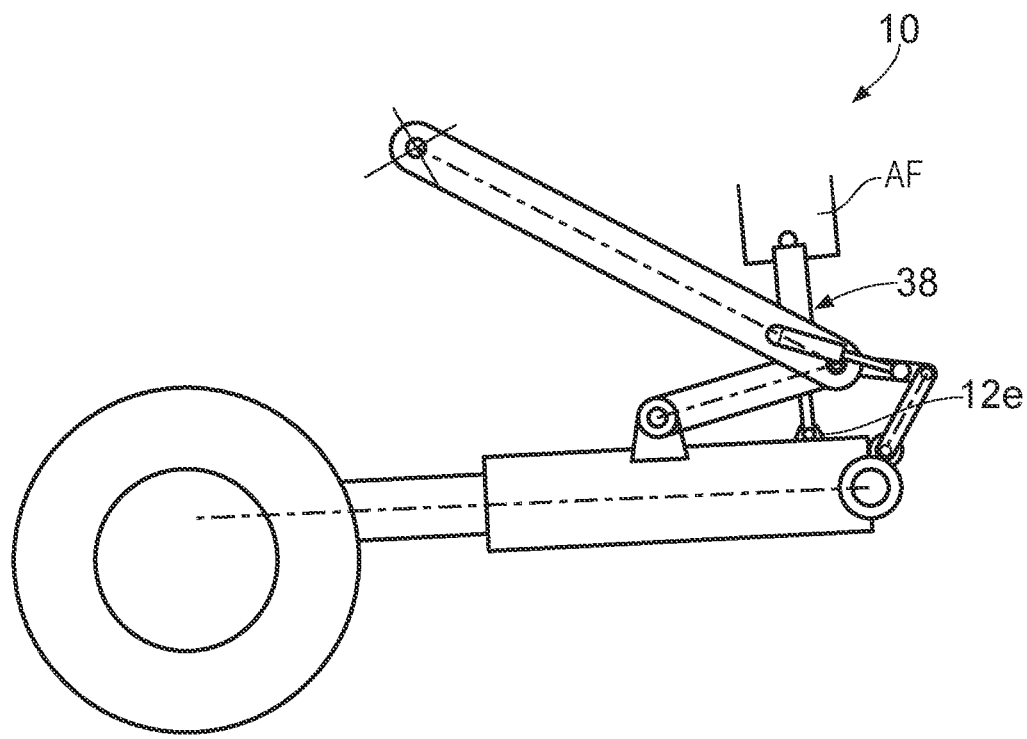
FIG. 3 is a diagram of the landing gear assembly of FIG. 1 with the lock link and the stay in the passive condition.
Figure 4:
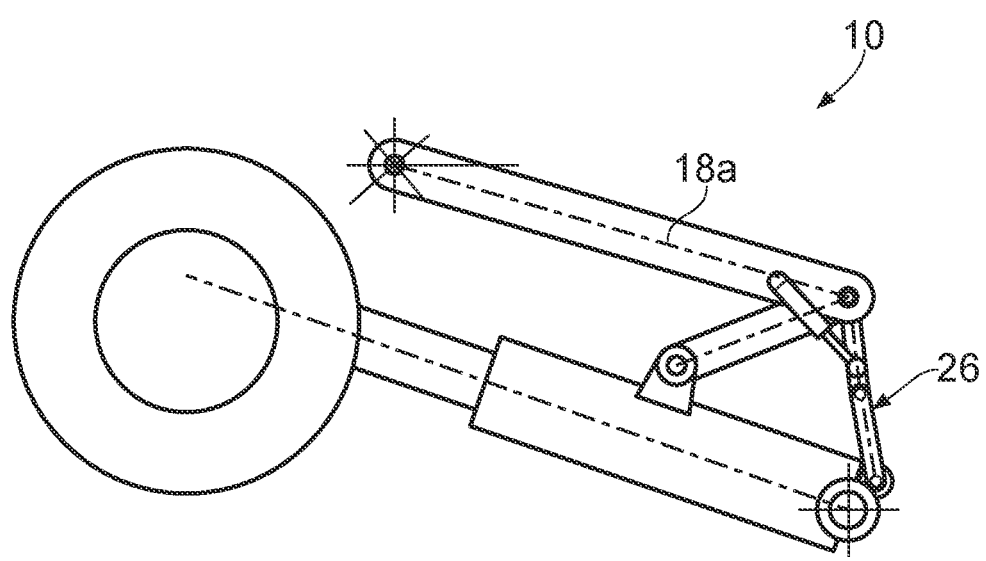
FIG. 4 is a diagram of the landing gear assembly of FIG. 1 with the lock link in the second locking condition and the stay in the passive condition.

The landing gear assembly 10 has a reinstating geometry. Thus, the lock link 26 is arranged such that it can be folded and unfolded between: a first locking condition, as shown in FIG. 1, in which the lock link 26 inhibits movement of the stay 18 from the locking condition to the passive condition; a passive condition, as shown in FIGS. 2 and 3, in which the lock link 26 permits movement of the stay 18 from the locking condition to the passive condition; and a second locking condition, as shown in FIG. 4, in which the lock link 26 inhibits movement of the strut 12 from the stowed condition towards the deployed condition.

The passive condition lies between the first and second locking conditions as the strut moves between the deployed condition and stowed condition.

In the illustrated embodiment the lock link elements 26a, 26b are elongate, straight bars having lug pairs at their ends to define the lock link pivot bearings 20, 30 and the lock link apex joint 28. Thus, each lock link element 26a, 26b has a longitudinal axis L3, L4 extending between the pivot axes at their ends. When in the locking condition, the longitudinal axis L3 of the lock link element 26a is generally aligned with the longitudinal axis L4 of the second lock link stay element 26b to place the lock link 26 in an over-centre arrangement in which one or more abutments (not shown) prevent further folding of the lock link 26 in one direction of rotation about the apex joint 28. Springs (not shown) may be employed in a variety of positions in order to retain the lock links in their locked positions when the gear is deployed or stowed. The lock link 26 reacts axial loads applied to it by the stay 18 when in the first locking condition. The lock link 26 also reacts loads applied to it by the main strut 12 attempting to move from the stowed condition when in the second locking condition. When the lock link 26 is folded, it does not react axial loads applied to it. In other embodiments the lock link elements 26a, 26b can have any suitable form.

The landing gear assembly 10 further comprises an unlock actuator 32 having a first end pivotally coupled via a first actuator pivot bearing 34 to the first stay element 18a to define a first actuator pivot point. A second end of the actuator 32 is pivotally coupled to the lock link 26 via a second actuator pivot bearing 36 to define a second actuator pivot point. The second actuator pivot bearing 36 is positioned so as to be closer to the lock link apex joint 28 than the second end of the second lock link element 26b in order to provide mechanical advantage, but this does not need to be so; for example, the second actuator pivot bearing 36 can be located on the other side of stay apex 20 so the unlock actuator 32 pushes, rather than pulls, to unlock from the deployed condition yet still reverses when stowed.

The unlock actuator 32 is operable to change the distance between the first actuator pivot bearing 34 and the second actuator pivot bearing 36 such that, in this embodiment, the actuator 32 can move the lock link 26 from the first locking condition to the passive condition by retracting. This is illustrated in FIG. 2. In embodiments of the invention the retraction actuator 38 can have any suitable configuration, such as being coupled at one end to a hard point on the airframe AF and at another end of a lug 12e on the main strut 12. In other embodiments, the unlock actuator can be coupled to the first stay element at a location closer to the stay pivot bearing 22 than the stay apex joint 20 and coupled to either link 26a, 26b of the lock link 26 such that the unlock actuator also serves as the retraction actuator.

Once the lock link 26 has been unlocked, further unfolding causes the stay 18 to be broken and unfolded to the passive condition. As shown in FIG. 3, a retraction actuator 38 can then move the main strut 12 to the stowed condition, with both the stay 18 and lock link 26 being passively articulated by movement of the main strut 12. Part way through the retraction phase the geometry of the assembly and the load from the retraction actuator will overpower the unlock actuator 32 and force it to reverse direction and extend and for its axis to pass over the centre of the stay apex joint 20. As the main strut 12 approaches the stowed condition the unlock actuator 32 continues to exert a pulling force and will now pull the lock link 26 into line and then over-centre, causing the lock link 26 to assume the second locking condition.

Thus, the landing gear assembly 10 includes an unlock actuator 32 that is anchored to the upper stay element 18a. The present inventor has found that this results in a reinstating geometry in which the unlock actuator 32 can apply load in one direction only to unlock the lock link 26 from the deployed strut condition and then lock it again in the stowed gear condition, thus avoiding the need for sequential control during movement of the main strut 12 from one condition to the other.

When the main strut 12 is to be deployed, the unlock actuator 32 can move the lock link from the second locking condition to the passive condition by extending.

Figure 5:
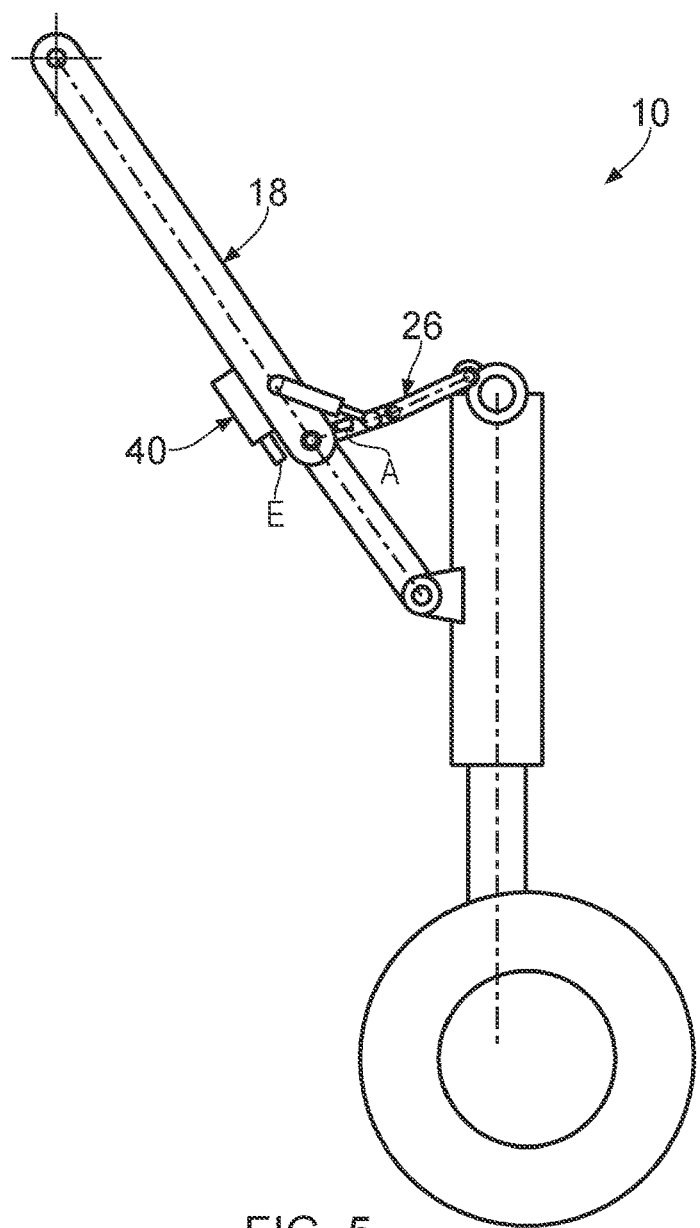
FIG. 5 is a diagram of the landing gear assembly of FIG. 1, showing the auxiliary unlock actuator when the gear is deployed.
Figure 6:
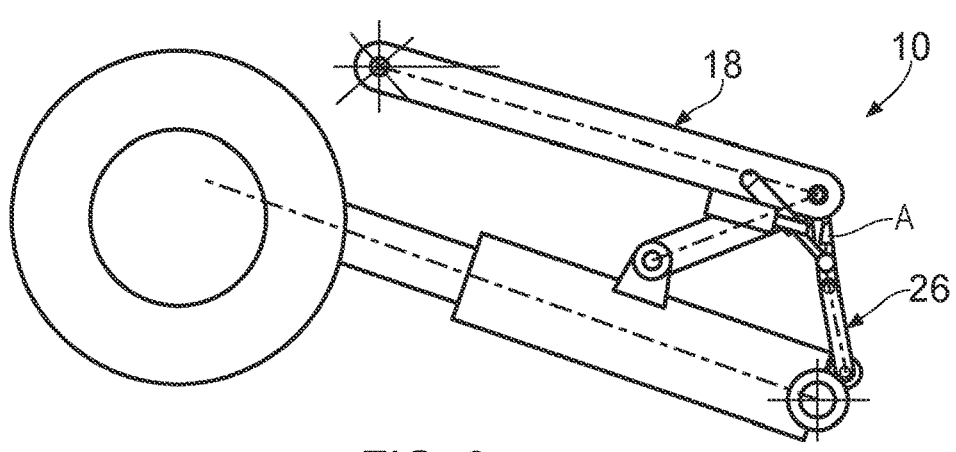
FIG. 6 is a diagram of the landing gear assembly of FIG. 1, showing the auxiliary unlock actuator when the gear is stowed.

As shown in FIG. 5, in the illustrated embodiment the landing gear assembly 10 further comprises a linear auxiliary unlock actuator 40 or "kicker" actuator arranged to either supplement, or replace, the unlocking force applied to the lock link 26 by the unlock actuator 32 when the lock link 26 is holding the main strut 12 in the stowed condition; for example if the unlock actuator fails. The auxiliary unlock actuator 40 is operable to change in length between a first extension state and a second extension state. The auxiliary unlock actuator 40 is mounted on the first stay element 18a such that it faces the lock link 26 when the main strut 12 is stowed, as shown in FIG. 6, such that extension of the auxiliary unlock actuator 40 causes an end effector, which in this embodiment is a free end E of actuator 40, to move along an actuation path to come into contact with a contact face on the lock link 26 to unlock the lock link 26 when the lock link 26 is in the second locking condition. The contact face can comprise an abutment formation A provided or mounted on the lock link 26 for contact with the free end E of the auxiliary unlock actuator 40 when it is operated to extend. It is preferred that the actuation path is generally orthogonal to the contact face, at least the portion of the actuation path that is adjacent to the contact face.

The auxiliary unlock actuator 40 is mounted in a positionally fixed relationship with respect to the stay element 18*a*; for example, by way of a pair of nut and bolt fixings or any other suitable fixing or bonding arrangement. Advantageously, when the auxiliary unlock actuator 40 is located on the upper stay element 18*a* and arranged to face the lock link 26 when the main strut 12 is stowed, the geometry of the main strut 12, stay 18, and lock link 26, means that the auxiliary unlock actuator 40 will not face the lock link 26 when the strut is in the deployed condition. This is shown in FIG. 5. Thus, when the lock link 26 is in the first locking condition accidental operation of the auxiliary unlock actuator 40 cannot unlock the lock link 26.

Figure 7:
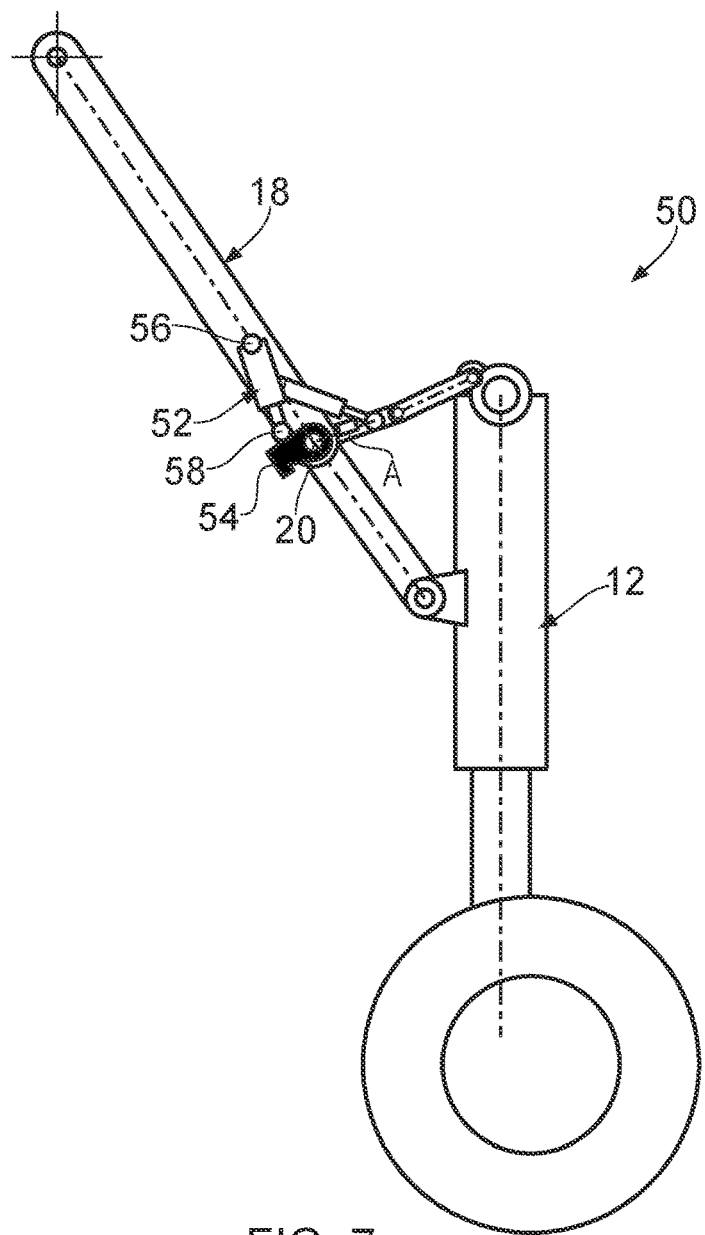
FIG. 7 is a diagram of an aircraft landing gear assembly according to another embodiment of the invention, with a different type of auxiliary unlock actuator, when the gear is deployed.
Figure 8:
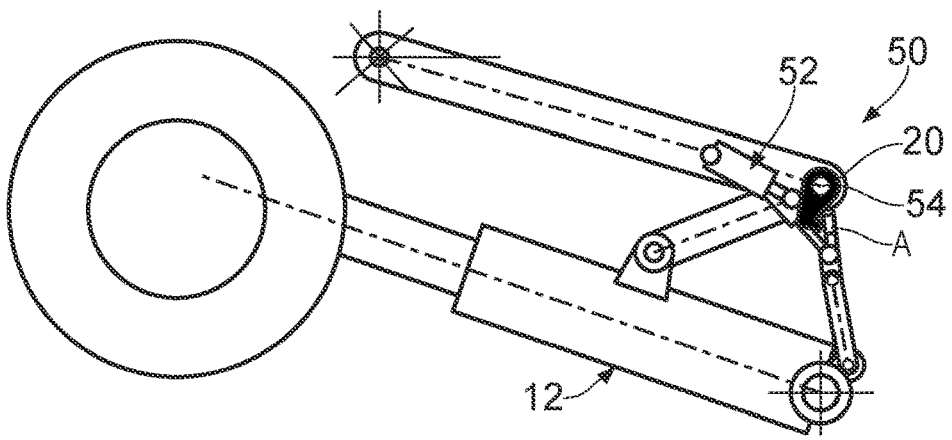
FIG. 8 is a diagram of the landing gear assembly of FIG. 7 showing the auxiliary unlock actuator when the gear is stowed.

Referring now to FIGS. 7 and 8, in another embodiment the landing gear assembly 50 can be provided with a linear auxiliary unlock actuator 52 that is operable to extend or retract to move a pivoting leg 54 pivoted to part of the stay 18 such as the apex joint 20. The actuator 52 is pivotally coupled to the stay 18 via pivot bearing 56 and pivotally coupled to the leg 54 via pivot bearing 58. As shown in FIG. 8, when the strut is in the stowed condition the swinging leg 54 is close enough to the lock link abutment A to unlock the lock link by way of, in this case, extension of the auxiliary actuator 52. However, when the strut 12 is in the deployed condition, as shown in FIG. 7, extension of the actuator 52 will not cause the leg 54 to contact the abutment A.

In other embodiments the auxiliary unlock actuator can be arranged to act directly on the lock link rather than an abutment on it.

Figure 9:
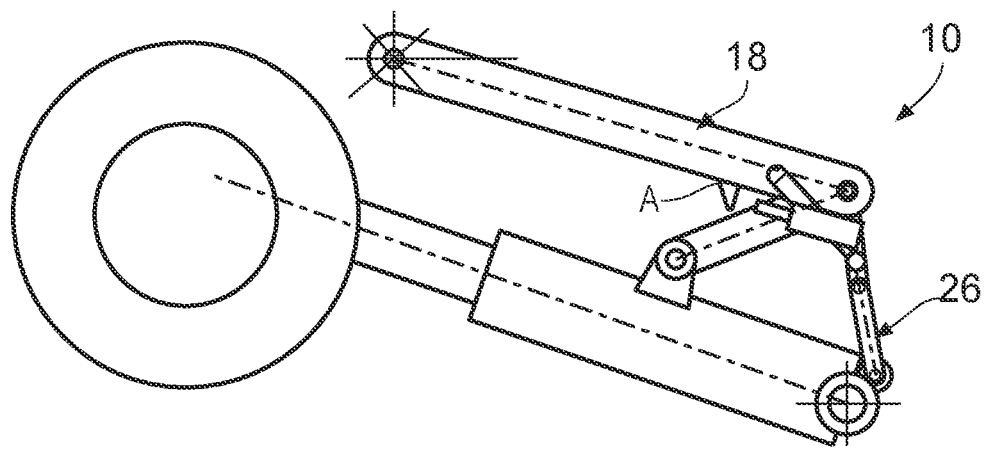
FIG. 9 is a schematic diagram, with the positions of the auxiliary unlock actuator and abutment reversed as compared to the embodiment shown in FIG. 5.

In other embodiments the above-described examples can be reversed such that the auxiliary unlock actuator is mounted on the lock link and arranged to contact the stay to break the lock link, such as schematically illustrated in FIG. 9. Such embodiments have an advantage in that the power lines to the unlock actuator and the auxiliary unlock actuator are relatively segregated, thereby reducing the likelihood of damage by a common cause. It is preferred that auxiliary unlock actuator is powered by a different power source, such as a different hydraulic supply, than the unlock actuator.

In other embodiments the landing gear assembly can have any reinstating geometry (i.e. the unlock actuator may not be coupled to the first stay element 18*a*) and be provided with an auxiliary unlock actuator 40 as described above.

In the illustrated embodiment the unlock actuator 32, the auxiliary unlock actuator 40, and the retraction actuator 38 are all linear actuators, but in other embodiments any suitable actuator type can be provided.

It should be noted that the above-mentioned embodiments illustrate rather than limit the invention, and that those skilled in the art will be capable of designing many alternative embodiments without departing from the scope of the invention as defined by the appended claims.

The invention claimed is:

1. An aircraft landing gear assembly comprising:
  a main load bearing strut having a first end configured to movably couple to an aircraft for the strut to move between a stowed condition for flight and a deployed condition for take-off and landing, and a second end configured to define or couple to a ground contacting assembly;
  a stay comprising a first stay element having a first end pivotally coupled to a first end of a second stay element to define a stay apex joint, a second end of the first stay element configured to pivotally couple to the aircraft and a second end of the second stay element configured to pivotally couple to the strut such that the stay is configured to fold and unfold between:
    a locking condition in which the stay is arranged to prevent movement of the strut from the deployed condition to the stowed condition; and
    a passive condition in which the stay arranged to permit movement of the strut from the deployed condition to the stowed condition;
  a lock link comprising a first link element having a first end pivotally coupled to a first end of a second link element to define a lock link apex joint, a second end of the first link element pivotally coupled to the strut at a first location which is closer to the first end of the strut than the second end, and a second end of the second link element coupled to the stay at or adjacent to the stay apex joint such that the lock link is configured to fold and unfold between:
    a first locking condition in which the lock link is arranged to prevent movement of the stay from the locking condition to the passive condition;
    a passive condition in which the lock link is arranged to permit movement of the stay from the locking condition to the passive condition; and
    a second locking condition in which the lock link is arranged to prevent movement of the strut from the stowed condition towards the deployed condition, the passive condition lying between the first and second locking conditions as the strut moves between the deployed condition and stowed condition; and
  an unlock actuator having a first end pivotally coupled to the first stay element at a first actuator pivot point and a second end pivotally coupled to the lock link at a second actuator pivot point such that the actuator can move the lock link from the first locking condition to the passive condition by one of extending or retracting and that the actuator can move the lock link from the passive condition to the second locking condition by the same one of extending or retracting.

2. An aircraft landing gear assembly according to claim 1, wherein the landing gear assembly is arranged such that the unlock actuator can move the lock link from the second locking condition to the passive condition by an opposite one of extending or retracting.

3. An aircraft landing gear assembly according to claim 1, wherein the first end of the unlock actuator is coupled to the first stay element at a location which is closer to the stay apex joint than the second end of the first stay element.

4. An aircraft landing gear assembly according to claim 1, wherein the second end of the unlock actuator is pivotally coupled to the second link of the lock link.

5. An aircraft landing gear assembly according to claim 1, further comprising an auxiliary unlock actuator including an end effector, wherein the auxiliary lock actuator is operable to move the end effector along an actuation path between a first extension state and a second extension state, wherein the auxiliary unlock actuator is either:

mounted on the stay and arranged such that when the lock link is in the second locking condition the lock link intersects the actuation path but when the lock link is in the first locking condition the lock link does not intersect the actuation path, such that movement of the end effector from the first extension state to the second extension state unlocks the lock link by contacting the lock link when the lock link is in the second locking condition, but movement of the end effector from the first extension state to the second extension state does not unlock the lock link when the lock link is in the first locking condition; or mounted on the lock link and arranged such that when the lock link is in the second locking condition the stay intersects the actuation path but when the lock link is in the first locking condition the stay does not intersect the actuation path, such that movement of the end effector from the first extension state to the second extension state unlocks the lock link by contacting the stay when the lock link is in the second locking condition, but movement of the end effector from the first extension state to the second extension state does not unlock the lock link when the lock link is in the first locking condition.

6. An aircraft landing gear assembly according to claim 5 wherein the auxiliary unlock actuator comprises a linear actuator.

7. An aircraft landing gear assembly according to claim 1, further comprising a retraction actuator operable to change in length between a first extension state and a second extension state, wherein the retraction actuator is coupled to the main strut such that movement of the retraction actuator from the first extension state to the second extension state causes the main strut to move from the deployed condition to the stowed condition.

8. An aircraft landing gear assembly according to claim 7 wherein the retraction actuator comprises a linear actuator.

9. An aircraft landing gear assembly according to claim 7, wherein the retraction actuator is distinct from the unlock actuator.

10. An aircraft landing gear assembly according to claim 1, wherein the unlock actuator comprises a linear actuator.

11. An aircraft including one or more aircraft landing gear assemblies, each: aircraft landing gear assembly comprising:
a main load bearing strut having a first end configured to movably couple to an aircraft for the strut to move between a stowed condition for flight and a deployed condition for take-off and landing, and a second end configured to define or couple to a ground contacting assembly;
a stay comprising a first stay element having a first end pivotally coupled to a first end of a second stay element to define a stay apex joint, a second end of the first stay element configured to pivotally couple to the aircraft and a second end of the second stay element configured to pivotally couple to the strut such that the stay is configured to fold and unfold between:
a locking condition in which the stay is arranged to prevent movement of the strut from the deployed condition to the stowed condition; and
a passive condition in which the stay is arranged to permit movement of the strut from the deployed condition to the stowed condition;
a lock link comprising a first link element having a first end pivotally coupled to a first end of a second link element to define a lock link apex joint, a second end of the first link element pivotally coupled to the strut at a first location which is closer to the first end of the strut than the second end, and a second end of the second link element coupled to the stay at or adjacent to the stay apex joint such that the lock link is configured to fold and unfold between:
a first locking condition in which the lock link is arranged to prevent movement of the stay from the locking condition to the passive condition;
a passive condition in which the lock link is arranged to permit movement of the stay from the locking condition to the passive condition; and
a second locking condition in which the lock link is arranged to prevent movement of the strut from the stowed condition towards the deployed condition, the passive condition lying between the first and second locking conditions as the strut moves between the deployed condition and stowed condition; and
an unlock actuator having a first end pivotally coupled to the first stay element at a first actuator pivot point and a second end pivotally coupled to the lock link at a second actuator pivot point such that the actuator can move the lock link from the first locking condition to the passive condition by one of extending or retracting and that the actuator can move the lock link from the passive condition to the second locking condition by the same one of extending or retracting.

* * * * *